UNITED STATES PATENT OFFICE.

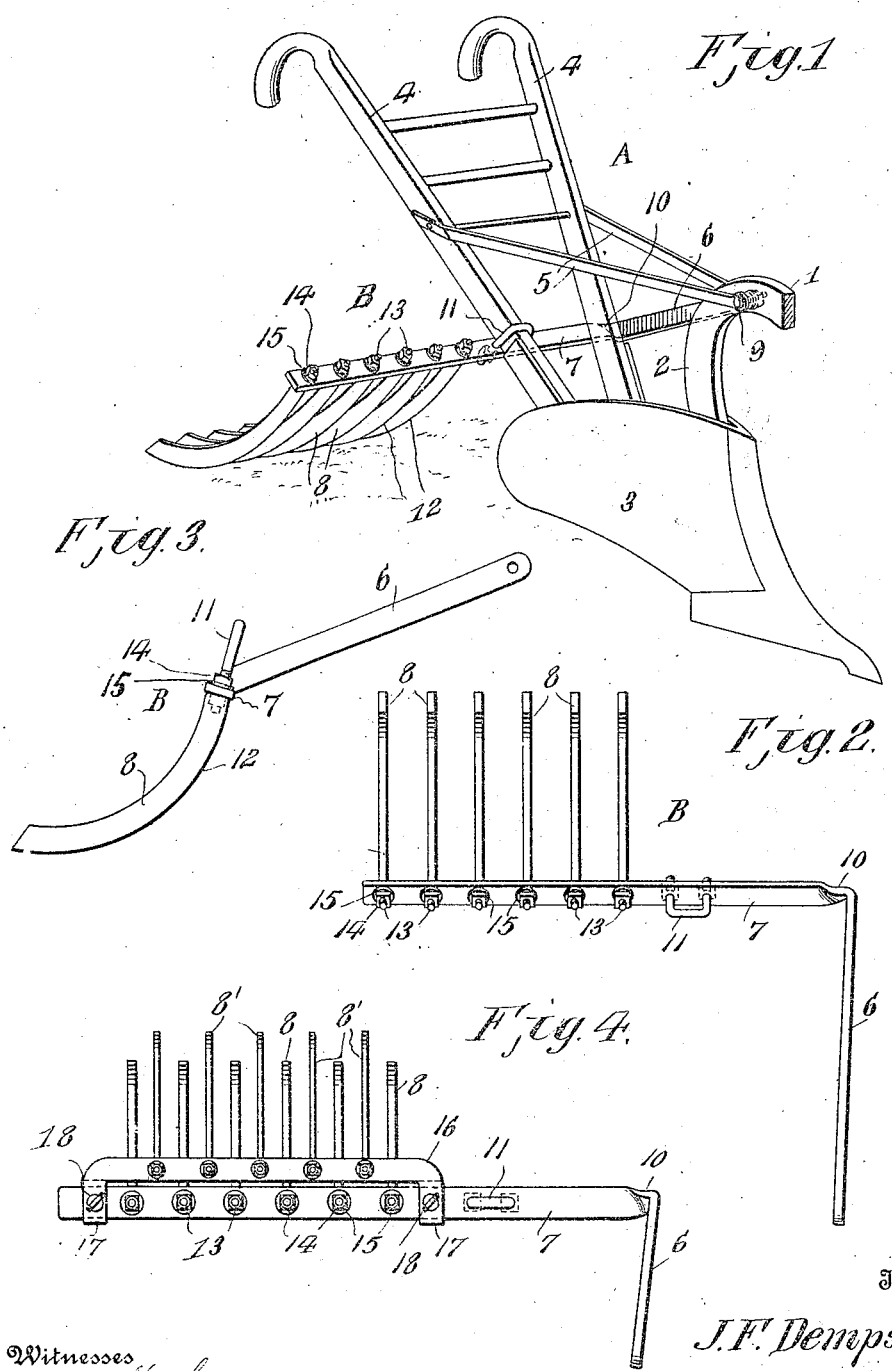

JESSE F. DEMPSEY, OF DELTA, ALABAMA.

HARROW ATTACHMENT FOR PLOWS.

1,071,551.

Specification of Letters Patent. Patented Aug. 26, 1913.

Application filed February 15, 1913. Serial No. 748,718.

*To all whom it may concern:*

Be it known that I, JESSE F. DEMPSEY, a citizen of the United States, residing at Delta, in the county of Clay and State of Alabama, have invented new and useful Improvements in Harrow Attachments for Plows, of which the following is a specification.

This invention relates to harrow attachments for plows, and it has for its object to produce an attachment applicable to and capable of being used in connection with a turning plow of any ordinary type for the purpose of breaking and pulverizing the soil as the furrow slice is being turned, thereby leaving the land in perfect condition for subsequent operations without necessity for ordinary harrowing.

A further object of the invention is to produce a soil pulverizing attachment for plows comprising a plurality of suitably supported cutters adapted to engage the furrow slice as it is being turned, and by the action of which the dirt will be finely divided and comminuted and without involving any particular and heavy strain on the team.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes alterations and modifications within the scope of the claims may be resorted to when desired.

In the drawing, Figure 1 is a perspective view, showing a plow equipped with the improved attachment. Fig. 2 is a top plan view of the harrow or soil pulverizing device detached. Fig. 3 is a side view of the same. Fig. 4 is a top plan view illustrating a modification.

Corresponding parts in the several figures are denoted by like characters of reference.

A designates an ordinary plow including the beam 1, standard 2, mold board 3, handles 4 and handle braces 5.

B designates the improved attachment which consists of a metallic bar 6 having a laterally extending arm 7 on which a plurality of teeth or cutters 8 are mounted. The forward end of the strap or bar 6 is connected with the beam 1 by means of the brace bolt 9 which also serves to connect the handle braces 5 with the beam. The arm 7 that extends laterally from the strap or bar 6, being bent substantially at right angles to said bar, is twisted, as shown at 10, so as to place the arm 7 flatwise in engagement with the under faces of the handles 4. A clip or cuff 11 serves to connect the arm 7 with the right hand handle, as shown, thereby establishing a rigid connection between the plow and the harrow attachment. The teeth 8, which are curved downwardly and rearwardly and which are provided with sharp cutting edges 12 at the front edges thereof, are provided with threaded shanks 13 that extend through the arm 7, being secured on the latter by means of nuts 14 and washers 15.

It will be seen that when a plow equipped with the improved attachment is in operation, the furrow slice turned by the mold board will be deposited in advance of the teeth or cutters 8, which latter, being suitably spaced apart, will finely divide the dirt, and will at the same time cut any stalks, roots and other trash that may be presented to the action of the teeth. The soil will thus be left in fine condition for the reception of seed without subsequent harrowing.

Under the modified construction illustrated in Fig. 4 of the drawing, a yoke or bracket 16 is provided, the arms of said bracket being provided with terminal sleeves 17 slidably engaging the arm 7. The yoke 16 carries a plurality of teeth or cutters 8' of similar construction to the cutters 8, except that they are preferably made more slender so as to serve effectively in subdividing the soil after being operated upon by the teeth or cutters 8. The yoke 16 may be adjusted by sliding it upon the arm 7 so as to dispose the cutters 8' midway between the cutters 8, or they may be variously spaced by proper adjustment of the yoke. The latter may be secured in adjusted position by means of set screws 18.

Instead of the teeth or cutters herein described, revolving disks may be used for the purpose of cutting or comminuting the soil, as will be readily understood, such cutters being mounted for rotation upon the arm 7, which latter, in such event, would be made of circular cross section.

Having thus described the invention, what is claimed as new, is:—

1. The combination of a plow having handles, handle braces and a bolt connecting said braces with the beam, of an attachment including a bar connected at its front end with the brace bolt, said bar having a laterally extending arm at its rear end, said arm being bent substantially at right angles to the bar, and said arm being twisted to present its upper face flatwise against the under faces of the handles, a clip whereby said bar is connected with one of the handles, and a plurality of teeth having threaded shanks extending through the arm and provided with fastening nuts, said teeth being curved downwardly and rearwardly and provided with sharp convex front edges.

2. The combination with a plow having a mold board and handles, of an attachment including a bar connected with the plow beam, an arm extending laterally from said bar and connected with one of the plow handles, and a plurality of cutting members carried by said arm and extending downwardly and rearwardly therefrom to engage a furrow slice turned by the mold board and to break and disintegrate said slice.

3. A harrow attachment for plows comprising a bar having a laterally extending arm provided with a clip, a yoke having terminal sleeves slidably engaging the arm, downwardly and rearwardly curved cutters associated with the arm and with the yoke, and means for securing the yoke at various adjustments for the purpose of variously spacing the teeth carried by the arm and by said yoke.

In testimony whereof I affix my signature in presence of two witnesses.

JESSE F. DEMPSEY.

Witnesses:
JOHN H. WHITLEY,
JOSEPH H. KENNEDY.